UNITED STATES PATENT OFFICE.

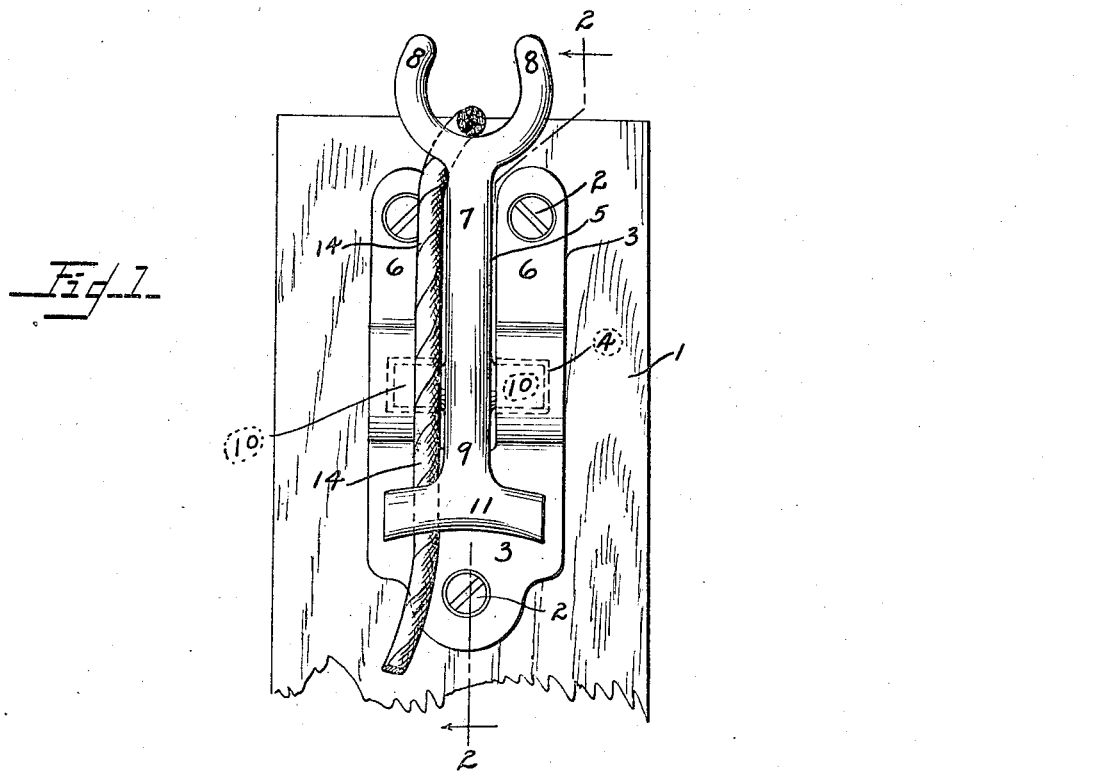
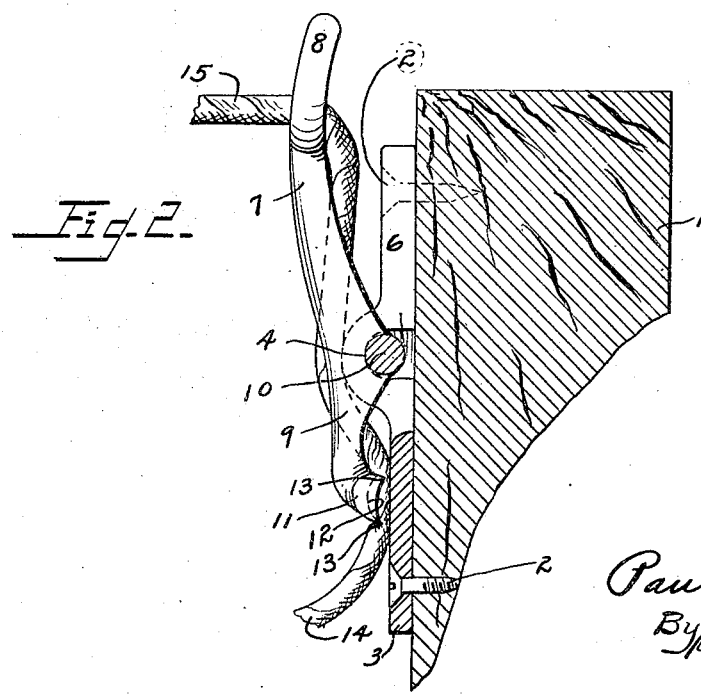

PAUL WERNER, OF ST. LOUIS, MISSOURI.

FASTENER.

1,417,286.

Specification of Letters Patent.   Patented May 23, 1922.

Application filed December 15, 1919. Serial No. 345,071.

*To all whom it may concern:*

Be it known that I, PAUL WERNER, a citizen of the United States, residing at the city of St. Louis, in the State of Missouri, have invented certain new and useful Improvements in Fasteners, of which the following is a specification.

This invention is a clip or grip for fastening cords, ropes, and the like of any size, and may be used wherever it is desired to hold a line extended or stretched between a plurality of points. This device saves the time and work of tying knots or wrapping the rope or cord around a stake or pin or other belaying device.

This device, if made of suitable size and strength, can be used for attaching hawsers or cables on board ship or elsewhere, and can be used, also, for fastening ropes in hoisting-machinery, derricks, and the like. If made of smaller size, it can be utilized for fastening clothes-line, either in doors or out of doors.

It can be made of cast-iron, malleable iron, aluminum, or other suitable material, and, as it is formed by molding and requires no machine to make, it is very cheap to manufacture. It can, also, be stamped and pressed, which may be even cheaper.

Furthermore, it has no springs or other parts to break or get out of order.

When a cord or rope or the like is held by this device, the greater the weight or strain put upon the cord or rope, the more tightly it is fastened. Another advantage of this device is that, when the weight or strain upon a line fastened at two points causes the same to sag between the said points, by reason of stretching (slippage against the "bite" of this device being impossible), a simple pull on one end of the line, causing the same to slide through this device, removes the said sag and again renders the line taut between the points of attachment.

In the accompanying drawings forming part of this specification, in which like numbers of reference denote like parts wherever they occur, Figure 1 is a front elevation; and Figure 2 is a sectional view on the line 2—2 in Figure 1.

This device is attached to a fence or post or window-frame or the like 1 by screws 2. Plate 3 is provided with a plurality of screw-holes for the screws 2, and the countersink 4 is formed in its rear. Plate 3 is bifurcated by a slot 5, thereby forming arms 6 of a fork. Tongue 7, having the arms 8 forming a fork or crotch, is adapted to move or lie in slot 5, and before plate 3 is screwed to the post 1 or the like the shank 9 of tongue 7 is moved through slot 5 until the trunnions 10 seat in countersink 4. Trunnions 10 rest so well within the said countersink that the rear surface of plate 3 is flush with the post 1 or the like. Gripping member 11 is formed on the rear end of tongue 7, and preferably contains groove 12. The edges 13 add to the "bite" of the said gripping member 11 upon rope or cord 14 or the like. It will be noted that gripping member 11 is slightly curved in face view, being directed upwardly from both ends toward the center, and that the respective edges 13 of the engaging portion of the member 11 are in a plane at a slight angle to the surface of the plate 3 underlying the member 11. These details are of importance, as through the relative position of the biting edges 13, it will be noted that under continued strain on the upper end of the tongue 7, the upper biting edge will be forced more deeply into the cord than the lower biting edge, and that any continued strain on the cord, by reason of the unequal engagement of the biting edges 13 causes a tendency toward movement of the cord which by the upwardly curving formation of the biting edges will direct the more loosely held portion of the cord toward the center. In other words one biting edge will do the effective holding while the other biting edge has a tendency under strain to direct the cord in a direction which will prevent its possible disengagement from the fastener.

When the device has been attached to its proper position in the way shown in the drawings, the line 14 can with ease be laid in the crotch or fork formed by the arms 8 and then the end of rope 14 or a part of such rope brought down so as to lie between grip 11 and plate 3. Thereupon, any pull on the end or part 15 in a direction away from the device results in pressing the grip 11 upon and into the line 14, and the harder the pull upon that part of the line designated as 15 the more tightly does the said grip press into the said line, the integral member comprising tongue 7 and its shank 9, and the grip 11 being pivoted by trunnions 10 in countersink 4.

It is immaterial whether the fixed member is wider than the movable one, or vice versa, i. e., the movable tongue can be made to straddle the fixed plate and perform the same functions as in the device illustrated in the drawings. This alternative form is not illustrated in the drawings. Moreover, the pivoting can be accomplished by the substitution of a spring-pressed or drawn pivot member, instead of providing the slot 5 for the insertion of the movable member into the necessary relation with the plate 3. This form, also, is not illustrated in the drawings. Another form not shown in the drawings will provide a spring-pressed or drawn pivot member in the construction mentioned in this paragraph in which the movable member clasps from the outside the fixed member.

Having thus described this invention, I hereby reserve the benefit of all changes in form, arrangement, order, or use of parts, as it is evident that many minor changes may be made therein without departing from the spirit of this invention or the scope of the following claims.

I claim:

1. A line clamp comprising a plate adapted for connection with a fixture, a tongue mounted for pivotal movement on the plate, that portion of the tongue above the pivot being formed to provide a rope receiving yoke, that portion of the tongue below the pivot being provided with a laterally extending gripping member formed on the surface next the plate with a concavity to present upper and lower biting edges arranged in a plane vertical of the tongue at an incline to the surface of the plate, said biting edges curving upwardly from their respective ends toward their centers, whereby said biting edges will engage the line with unequal holding effects and their curved formation tends to direct the line toward the longitudinal centers of said edges.

2. A rope clamp comprising a plate and a clamping member pivoted thereto, having a concaved biting edge serving to clamp the rope against the plate and to restrain the clamped portion of the rope from movement in the direction of the ends of the said edge there being a wedging engagement obtained between the biting edge and rope which tends to urge the rope toward the center of the said edge.

In testimony whereof I hereunto affix my signature.

PAUL WERNER.